United States Patent

[11] 3,603,281

[72] Inventor David B. Froelich
 La Mirada, Calif.
[21] Appl. No. 884,932
[22] Filed Dec. 15, 1969
[45] Patented Sept. 7, 1971
[73] Assignee Spectrol Electronics Corporation
 City of Industry, Calif.

[54] DIAL MECHANISM FOR ELECTRONIC COMPONENTS
 3 Claims, 2 Drawing Figs.
[52] U.S. Cl..................................................... 116/115,
 74/813, 116/133
[51] Int. Cl...................................................... G01p 13/00
[50] Field of Search............................................ 116/115,
 115.5, 124, 124.1, 124.4, 133; 200/167, 168;
 74/553, 10.2, 813; 338/120; 324/154, 115, 155;
 287/53

[56] References Cited
UNITED STATES PATENTS
| | | | |
|---|---|---|---|
| 2,179,281 | 11/1939 | Coultrip | 116/133 UX |
| 2,651,281 | 9/1953 | Nathan | 116/133 |
| 3,109,412 | 11/1963 | Fuhrman et al. | 116/124 |
| 3,150,635 | 9/1964 | Root | 116/124 |
| 3,151,598 | 10/1964 | Bourns et al. | 116/115 |

*Primary Examiner*—Louis J. Capozi
*Attorneys*—Harry G. Martin, Jr. and J. Raymond Curtin ABSTRACT: A dial mechanism for an electronic component having a spindle connected to an indicator dial for indicating the rotational position of the shaft of the component removably secured therewith by a setscrew. The shaft of the electronic component is accessible for manipulation through a central aperture in the spindle member to enable the shaft to be accurately phased with indicator dial. A knob member is snapped into a suitable detent and covers the setscrew and the aperture in the spindle member after the desired phase relation is achieved between the spindle member and the shaft.

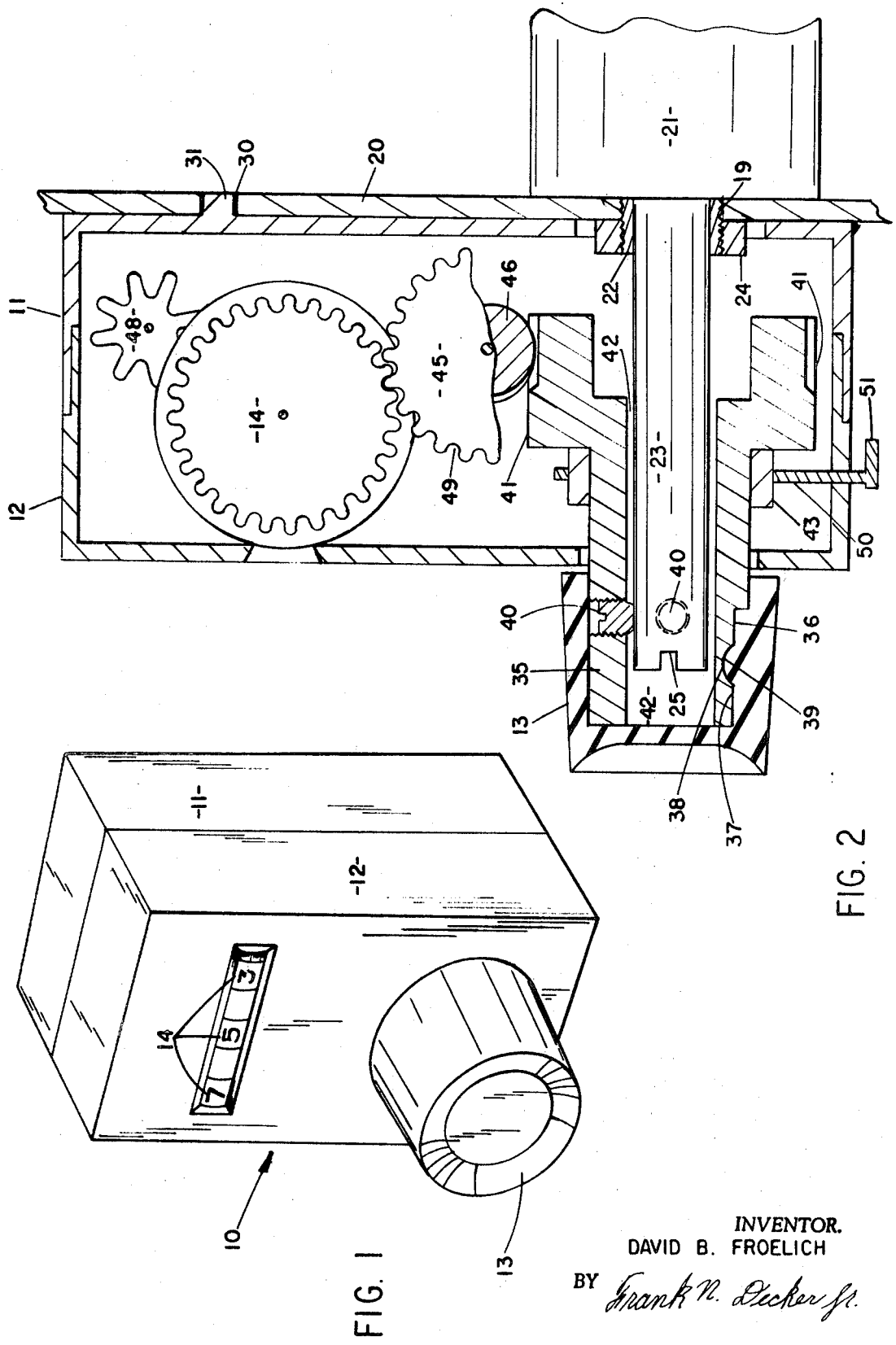

DIAL MECHANISM FOR ELECTRONIC COMPONENTS

BACKGROUND OF THE INVENTION

This invention relates to dial members for indicating the rotational position of an electronic component, such as a turns-counting dial for a multiturn potentiometer.

Conventional turns-counting dials generally have one or more digit or indicator wheels actuated by a spindle member which is secured to the shaft of the electronic component by a set screw which is either accessible through the knob of the dial or through some external part connected therewith. During assembly, the potentiometer is first mounted on a panel member with its shaft protruding from the face of the panel. Next, the rotational position of the potentiometer is determined by either mechanical or electrical means. The spindle member of the turns-counting dial is rotated by the knob to provide a reading corresponding to the rotational position of the potentiometer. The turns-counting dial is then very carefully assembled on the potentiometer by inserting the spindle member over the shaft while attempting to simultaneously, blindly insert a locating pin on the body of the dial through a locating aperture in the front panel. A setscrew on the spindle is then engaged with the shaft to maintain the phase relationship between the dial and the shaft and to retain the dial in engagement with the front panel if the assembler has been successful in maintaining the proper phase relation during assembly.

A problem arises with dials of the foregoing type when it is necessary to very accurately maintain a desired phase relation between the dial and the potentiometer. Specifically, the locating pin and the aperture in the front panel which must be aligned with each other are not visible during assembly. Frequently, therefore, after the dial is slipped over the shaft, it is necessary to rotate the dial sufficiently to cause the locating pin to slip into the corresponding panel hole. At the same time, while rotating the dial, the phase relationship with the shaft is likely to change, therefore requiring repeated attempts at phasing them properly. Furthermore, it is generally impossible to adjust the phase relation after assembly of the dial because the shaft is not accessible from the front panel.

Accordingly, it is a principal feature of this invention to provide an indicator dial mechanism having means for accurately phasing the shaft member and the indicator dial after the locating pin has been inserted in the panel member.

SUMMARY OF THE INVENTION

In accordance with this invention, there is provided a dial having visible indicia of the rotational position of the shaft of an electronic component adapted to be attached thereto. The shaft of the electronic component is secured by means of setscrews to a spindle member having an axial aperture extending completely therethrough. A suitable knob is provided with a detent and means for assembling it over the shaft and spindle. The dial is mounted on a front panel with the aperture in the spindle member being slipped over the shaft of the electronic component. The shaft of the electronic component is accessible through the open end of the aperture in the spindle so that the spindle is either manually or mechanically held while the shaft is rotated for proper phasing with the dial, or the shaft is held stationary and the spindle member rotated for the same purpose. When proper phasing is achieved, setscrews are tightened for maintaining the phase relationship, and the knob member is assembled to conceal the setscrew holes and to cover the open end of the spindle.

BRIEF DESCRIPTION OF THE DRAWINGS

FIG. 1 illustrates a perspective view of an assembled turns-counting dial in accordance with this invention and showing the location of the knob and digit wheels; and FIG. 2 illustrates a simplified cross section on a median plane through a turns-counting dial in accordance with this invention.

DESCRIPTION OF A PREFERRED EMBODIMENT

Referring to FIG. 1, there is illustrated a turns-counting dial mechanism 10 commonly referred to in the art as a turns-counting dial having a housing comprising a base member 11 and a cover member 12. A knob 13 is provided for rotating the electronic component such as a multiturn potentiometer, the rotational position of which is indicated by the digit wheels 14 visible through an aperture in cover 12 of the turns-counting dial. While a digital turns-counting dial is illustrated in the drawings, this invention is equally applicable to vernier and nonvernier-type mechanisms having any type of desired position readout arrangement. A dial of the type illustrated is particularly useful for indicating the rotational position of a multiturn potentiometer where the angular position of the knob along is insufficient to indicate the electrical position of the wiper element, but the invention may be otherwise embodied with respect to any single- or multiple-turn component such as variable resistors, variable capacitors, and tuned indicators.

Referring to FIG. 2, a potentiometer 21 is secured to panel 20 by means of a mounting nut 24 which is threaded onto stud 22 through which shaft 23 extends. Shaft 23 is provided with a screwdriver slot 25 formed in its exterior end for manipulation of the shaft. A locating hole 30 is formed in panel 20 at a location spaced from mounting aperture 19 in the panel. A locating pin 31 is integrally formed on and projects from base member 11 of dial 10 to prevent the housing of the dial from rotating after it has been assembled with the potentiometer on the front of panel 20.

Dial 10 is provided with a spindle member 35 which is journaled for rotation within a bearing portion 43 formed integrally with base 11. Spindle member 35 has a cylindrical aperture 42 extending completely axially therethrough. The radially outward surface of spindle member 35 is preferably generally cylindrical, but is provided with a flat or splined locating surface 36 which mates with a corresponding flat or splined locating surface formed interiorly of knob 13. Suitable detent means are provided so that knob 13 may be axially snapped into telescopic engagement with spindle member 35. For this purpose, spindle member 35 is preferably formed with a transverse recess 38 on flat portion 37 and knob member 13 is preferably provided with a complementary transverse mating ridge 39. Knob 13 is preferably made of a resilient plastic material which deforms sufficiently to enable ridge 39 to cam over flat 36 and then to snap into recess 38 when knob 13 is telescopically inserted over spindle member 35.

One or more setscrews 40 are threadedly inserted in transverse threaded aperture in the radial wall of spindle member 35. As will be seen in the drawings, the setscrews are located in a portion of the spindle member which extends outwardly from the front face of cover 12 and the setscrew apertures are covered by knob 13 after the knob is in assembled position.

Spindle member 35 has an annular gear toothed surface 41 which mates with a worm gear 46 in drive gear assembly 45. The drive gear is also provided with a gear surface 49 which mates with a geared digit wheel 14. Where a plurality of digit wheels is provided, as customary in multiturn turns counting dials, one or more transfer gears 48 are provided to actuate adjacent digit wheels which count the revolutions of the preceding digit wheels. A suitable brake ring 50, having brake lever 51, extending from the housing is provided to prevent rotation of shaft 23 when desired by camming bearing 43 into engagement therewith. The turns-counting mechanism is schematically illustrated for purposes of simplifying description and may be of any well-known digital or nondigital indicating type.

In operation, potentiometer 21 is first secured to panel 20 by inserting threaded stud 22 through aperture 19 and tightening mounting nut 24. Thereafter, dial 10 is slipped over shaft 23 by telescoping spindle member 35 over the shaft without regard to the phase relation therebetween. The housing is then rotated about shaft 23 until locating pin 31 slips into locating aperture 30 in panel 20. Knob 13 is removed from spindle 35, exposing setscrew 40. Spindle 35 is held stationary by hand or by setting brake 50. A screwdriver is inserted through the exposed open end of axial bore 42 in spindle 35 and the shaft of potentiometer 21 is rotated with the screwdriver to provide the desired phase relation between digit dials 14 and the mechanical positions of the shaft. Alternately, spindle member 35 may be rotated by hand while braking the shaft with the screwdriver to give a particular reading of digit dials 14 for an electrically or mechanically determined rotational position of shaft 23. After dial 10 and shaft 23 are properly phased, set screws 40 are tightened to maintain the phase relationship and to secure the dial mechanism in place on panel 20. Thereafter, knob 13 is telescopically engaged over spindle 35 with the corresponding flats aligned with each other so that the knob snaps into position and is retained on the spindle by means of detent portions 38 and 39 to cover the open axial end of the spindle and the setscrew holes.

The turns-counting dial described is capable of being accurately phased with respect to the rotary shaft on the device with which it is associated independently of the assembly of the manipulator knob with the dial because the setscrew does not pass through the knob. The shaft of the device is accessible through the open end of the spindle during assembly of the dial with its associated components so that accurate phasing can easily be achieved at any time. Consequently, a dial mechanism of the type described overcomes the problems previously encountered in attempting to accurately mount and phase a turns-counting dial on a shaft.

While, for purposes of illustration, a preferred embodiment has been described, this invention may be otherwise embodied within the scope of the following claims.

I claim:

1. A dial mechanism for adjusting and indicating the position of a rotatably adjustable electrical component secured to a panel and having a rotatably adjustment shaft with a tool receiving recess therein projecting from the face of the panel, comprising: a housing; indicator means mounted on said housing for providing an indication of the rotational position of the rotatable shaft of the electrical component to which said dial mechanism is adapted to be connected; a spindle member mounted for rotation on said housing and connected in driving engagement with said indicator means for indicating the rotational position of the spindle member, said spindle member having a cylindrical axial passage extending entirely therethrough of a transverse dimension at least as great as that of the shaft of the electrical component for telescopically receiving the shaft of the electrical component, the end of the shaft of said electrical component being directly accessible through an open end of said axial passage in said spindle member from the exterior of said housing for manipulation and adjustment of the shaft by an adjustment tool inserted into the tool receiving recess therein to a predetermined, desired rotational phase relationship with respect to said spindle member and said indicator means after assembly of said dial mechanism over the shaft of said electrical component; first securing means associated with said spindle member for removably securing the shaft in fixed relation with the spindle member to retain said predetermined desired phase relation therebetween, said first securing means being the sole means for securing said dial mechanism to said electrical component; locating means carried on said housing and cooperable with the panel for preventing rotation of said housing with respect to the panel; and a knob member coaxially mounted with said shaft and said spindle member positioned in overlying relation with the open end of said spindle member; second securing means associated with said spindle member and said knob member for removable securing said knob member in fixed relation with said spindle member after said spindle member is secured to said shaft by said first securing means in the desired phase relation therewith, whereby rotation of said knob member is enabled to rotate simultaneously said spindle member and the shaft of the electrical component secured thereto and to actuate said indicator means to provide an indication of the rotational position of the shaft, the phase relationship between the shaft and said spindle member being adjustable entirely independently of the securing of said knob on the spindle member of said dial mechanism and after assembly of the component and the dial mechanism on the panel.

2. A dial mechanism as defined in claim 1 wherein said first securing means comprises a threaded transverse aperture in said spindle member having a setscrew therein for removably securing said spindle member to the shaft of the electrical component inserted through said cylindrical axial passage in the spindle member; and said knob member telescopically engages said spindle member and covers said threaded transverse aperture and said cylindrical passage when assembled therewith.

3. A dial mechanism as defined in claim 1 wherein said knob is telescopically engaged over said spindle member, said spindle member having a detent portion, said knob having a detent portion complementary to the detent portion in said spindle member the detent portion of said knob being resiliently deformable to enable said complementary detent portions to snap into engagement with each other, by axially assembling the knob into telescopic engagement with the spindle member.